April 10, 1962   F. SCHNEIDER   3,028,802
ROASTING PANS AND ADJUSTABLE SPITS THEREFOR
Filed July 5, 1961   2 Sheets-Sheet 1

INVENTOR.
FREDERICK SCHNEIDER
BY
Charles A. Morton

April 10, 1962 F. SCHNEIDER 3,028,802
ROASTING PANS AND ADJUSTABLE SPITS THEREFOR
Filed July 5, 1961 2 Sheets-Sheet 2
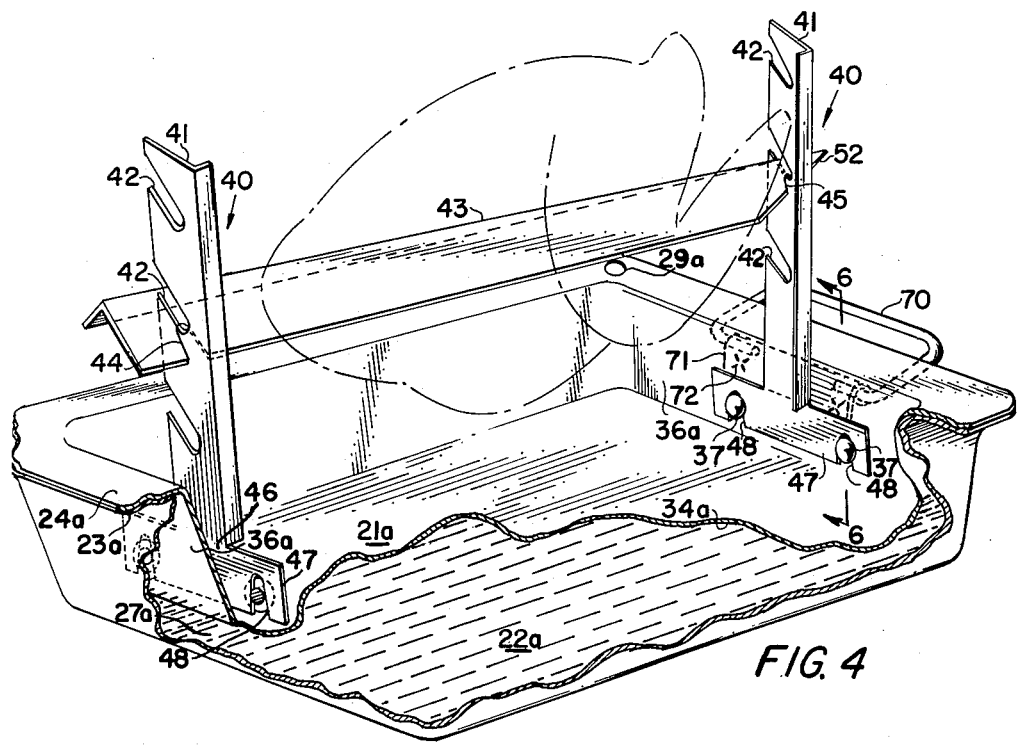
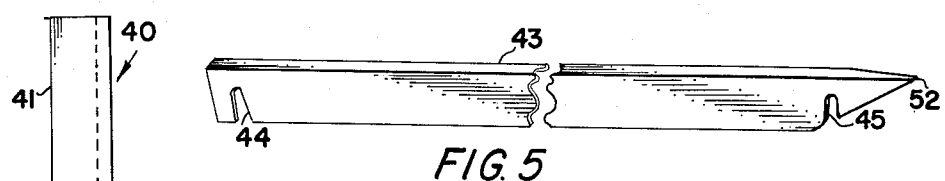
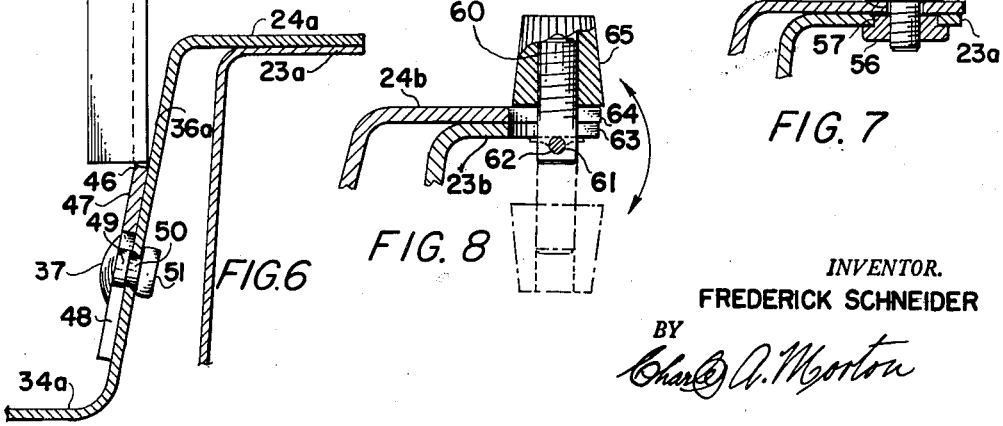
INVENTOR.
FREDERICK SCHNEIDER
BY
Charles A. Morton

3,028,802
ROASTING PANS AND ADJUSTABLE SPITS THEREFOR

Frederick Schneider, 88—62 81st Road, Glendale 27, N.Y.
Filed July 5, 1961, Ser. No. 121,876
5 Claims. (Cl. 99—421)

This invention relates to improvements in roasting pans and adjustable spits therefor of the knockdown type.

Among the difficulties experienced in roasting meat and poultry, is that the grease from the roast burns in the pan and generates acrid fumes which are difficult to confine to the kitchen. The burning grease discolors the roasting pan, and the discoloration is very difficult to remove. When the roast is broiled upon a spit above the roasting pan, the spit is either prone to bend out of shape when supporting a heavy roast, or it is unnecessarily heavy and clumsy to handle. It is also important that the supports for the spit shall be stable.

One object of this invention is to eliminate the burning of the grease and the fumes and smoke created by the burning grease.

Another object is to reduce the time and the labor required in cleaning and in storing a roasting pan.

Another object is a spit rack which is stable when in use and which can be quickly dismantled and stored inside the roasting pan.

Another object is a spit and a rack therefor which are light in weight, strong, durable, and easy to manipulate.

Another object is a double jacketed roasting pan and knockdown spit therefor which consist of but few and simple parts which can be manufactured at low cost, which are easy to assemble, disassemble, clean, and store, and which are very efficient and durable in use.

These, and other objects, will all more fully appear from the detailed description.

In the drawing wherein like reference characters designate corresponding parts throughout the several figures:

FIG. 4 is a perspective view of a modified form of my invention with the spit as in applied position with a roast shown in phantom and with certain other parts partially broken away.

FIG. 5 is a perspective view partially broken away of the spit.

FIG. 6 is a cross sectional view of a fragment taken along the line 6—6 of FIG. 4, looking in the direction of the arrows.

FIG. 7 is a view of a detail shown partly in cross section; and

FIG. 8 is a view of a detail of a modified form shown partly in cross section.

Figure 1:
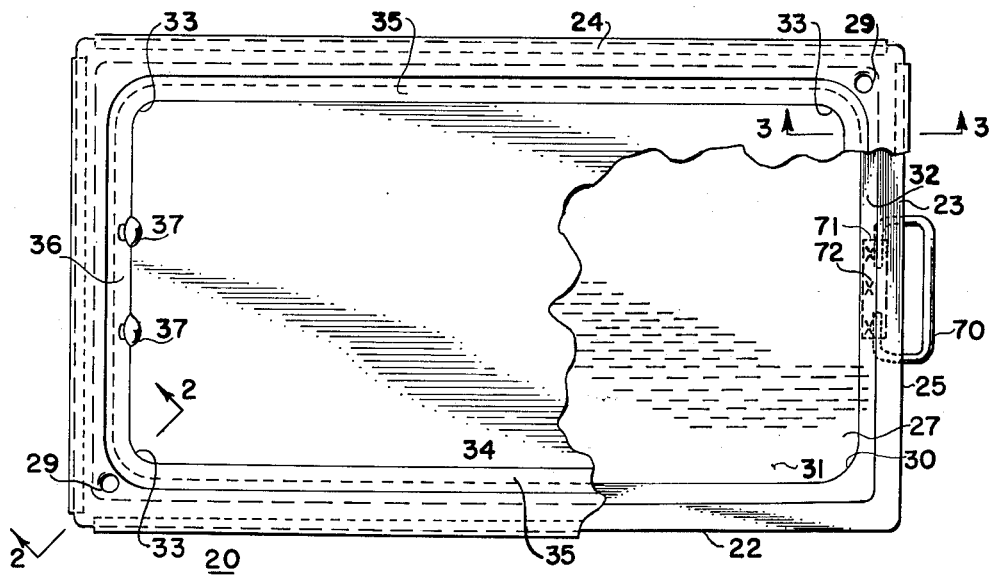
FIG. 1 is a plan view partially broken away of one form of roasting pan embodying my invention but with the spit structure dismounted and removed.
Figure 2:
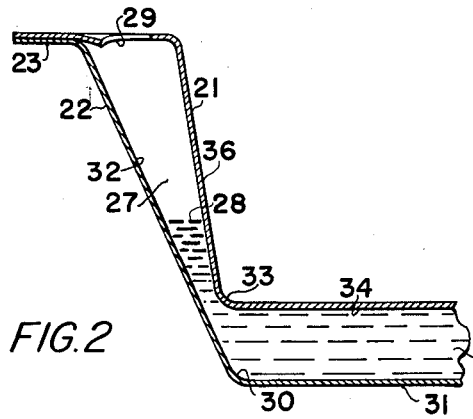
FIG. 2 is a cross sectional view of a fragment taken along the line 2—2 of FIG. 1, looking in the direction of the arrows.
Figure 3:
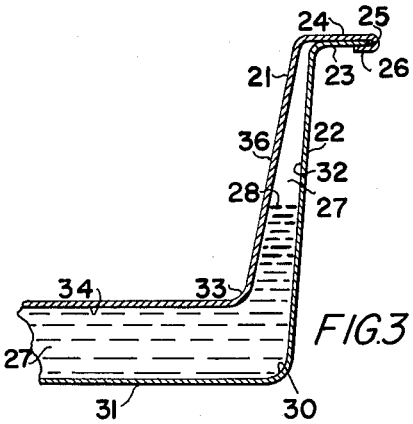
FIG. 3 is a cross sectional view of another fragment taken along the line 3—3 of FIG. 1, looking in the direction of the arrows.

Referring first to FIGS. 1, 2, and 3, the roasting pan 20 includes an inner pan 21 sized to nest and seat in outer pan 22. The outer pan 22 is provided with an outwardly projecting lateral flange 23, which extends around the upper edge of pan 22. The inner pan 21 is shallower than the outer pan 22 and the upper edge of the pan 21 is also provided with an outwardly projecting or lateral flange 24 which overlies the flange 23 surrounding the outer pan 22. The flange 24 is bent around the edge face 25 of the flange 23 and is then bent inwardly at 26 beneath the flange 23 to lock the inner pan 21 and the outer pan 22 together and form a jacketed roating pan having a chamber 27 extending underneath and around the inner pan 21. The inner pan 21 and the outer pan 22 when thus interlocked constitute a hollow jacket for containing water filled to a level above the bottom of the inner pan 21 as indicated at 28 in FIGS. 2 and 3.

Water may be introduced into the hollow jacket or chamber 27 through one of the openings 29, 29 situated at diagonally opposite corners of the lateral flange 24 of the inner pan 21 (FIGS. 1 and 2). The corners 30 formed at the junction of the bottom wall 31 and the side and end walls 32, and at the junction of the side walls with the end walls are all rounded to reduce risk of injury to the operator and facilitate the cleaning of the outer pan 22. Similarly the corners 33 formed at the junction of the bottom wall 34 of the inner pan 21 with the side walls 35, 35 thereof and with the end walls 36, 36, and at the junction of the side walls 35, 35 and the end walls 36, 36, are also rounded to facilitate the cleaning of the inner pan 21.

Two studs 37, 37 are mounted in spaced relation to each other near the bottom of each end wall 36, 36 of the inner pan 21 (compare FIGS. 1 and 4). These studs constitute means for detachably securing the racks for the spit to the end walls 36, 36, as best shown in FIG. 4.

The construction of the rack 40 and of the spit 43 is best shown in FIGS. 4, 5, and 6. The rack 40 (FIG. 4) consists of two identical vertical supports 41, 41 which are angle-shaped in cross section and have a plurality of downwardly extending, inwardly inclined, notches, 42, 42 formed at similarly spaced intervals in one arm of each angle-shape. Each notch 42 is sized to receive one arm of the spit 43 which is also angle-shaped in cross section. The spit 43 is also notched at 44 and 45 adjacent the opposite ends thereof, and the spit is long enough to permit the notches 44 and 45 to engage in, and interlock with, any of the notches 42, 42 which are positioned upon the same level of the rack 40. When thus interlocked the spit cross braces the vertical supports 41, 41 which unite to form the rack 40, and the rack 40 securely supports the spit 43 and the roast impaled thereon. The notched end 45 of the spit 43 is bevelled along each arm of its angle-shape to a relatively sharp point for penetrating the body of a roast, and once the roast is impaled upon the spit 43 its angle-shaped arms prevent the roast from slipping or sliding along the spit.

The lower end of each support 41 is angularly offset at 46 to conform with the angle of inclination of the wall of the inner pan, and each support 41 merges with a flat plate 47 which is provided with notches 48, 48 which are spaced upon the same centers as the studs 37, 37 and are sized to register under the heads of the studs 37, 37 and to engage the stepped shoulders 49, 49 of said studs. The inclined walls of the inner pan, the base plates 47, 47, and their notches 48, 48, the shoulders 49, 49 of the studs and their enlarged heads 37, 37, and the cross braced supports 41, 41 interlocked with the notched spit 43, all cooperate to maintain the supports 41, 41 in an upright position. The neck or shank 50 of each stud is enlarged as by riveting to form a head 51 which locks against the rear face of the end walls of the inner pan (compare FIGS. 4 and 6); the shanks 50, 50 of each stud pass through precision sized holes in the end walls of the pan, and the enlarged shoulders 49 and the enlarged heads 51 cooperate to insure a water-tight fit.

The roast is impaled upon the spit by forcing the pointed end 52 (FIG. 5) through the body of the roast lengthwise thereof; and when the roast is thus impaled by the spit, the angle-shaped spit prevents the roast from sliding along the spit. The supports 41, 41 are brought into opposed relation to form the rack 40, by engaging the notches 48, 48 in each base plate 47 with the shoulders 49 of the studs 37, so that the base plates are tightly clamped between the end walls of the pan and the enlarged heads of the studs 37, 37. The notches 44 and 45 in the spit 43 are brought into locking registry with corresponding notches 42 in each support 41 at the desired level above the roasting pan 20 to effect cooking. During the cooking operation the water in the water jacket is maintained at a level above the bottom of the inner pan so that the temperature of the inner pan is controlled and never approaches the flash point of the grease, so that any grease falling into the pan cannot burn or ignite. After the roast is cooked, the spit 43 is removed from the rack 40 and removed from the roast, and the rack is dismantled. The grease is removed from the inner pan and the water is emptied from the chamber 27. The inner and the outer pans, and the rack and the spit, are easily cleaned, and the rack and the spit may be placed inside the roaster 20, and the entire apparatus may then be stored away ready for reuse.

In the modified form shown in FIGS. 4, 6, and 7, the pans 21a and 22a are not permanently secured together, but may be correlated by nesting the inner pan 21a in the outer pan 22a with the holes 55 in the lateral flanges 24a of the inner pan 21a in registry with the internally threaded shoulder nuts 56, 56 which are welded or otherwise secured in holes 57, 57 formed in the lateral flange 23a of the outer pan 22a and then screwing the cap screws 58 into the nuts 56, 56 to draw the flanges 24a and 23a together and complete a water-jacketed roasting pan as before. The chamber 27a between the nested pans may be filled with water to a suitable level above the bottom 34a of the inner pan through the openings 29a, 29a in the lateral flange 24a; or water may be added to the outer pan 22a before the inner pan 21a is nested therein. The shoulder nuts 56 and their cap screws 58 may be placed at suitably spaced intervals around the flanges of the roasting pan.

In the modified form shown in FIG. 8, the flange 23b of the outer pan is notched to receive two or more threaded studs 60. Each stud 60 is drilled to provide a cross hole 61 for a pin 62 which is secured to the underface of the flange 23b in any suitable manner, as by welding the opposite ends of the pin to the flange 23b upon opposite sides of the notch 63. The stud 60 is free to swivel upon the pin 62 and swing above and below the notch. The flange 24b is similarly notched at 64 to receive the stud 60. A cap nut 65 mounted upon the threaded stud 60 is tightened against the flange 24b to lock the inner and the outer pans together. The flanges 23b and 24b may be notched at suitably spaced intervals around their peripheries to accommodate the swivelled studs 60 and their associated cap nuts 65.

The inner and outer pans may be made of aluminum, and the various angle-shapes may also be made of aluminum. By using angle-shaped stock for the supports 41, 41 of the rack 40 and for the spit 43, the resulting structures are quite strong and will not bend or buckle when put into use for the purpose intended. The roasting pan and its rack and spit will be relatively light in weight so that they can be handled quite conveniently by the housewife, and the rack and the spit are so easily assembled and disassembled that their manner of use will be easy to grasp and the structures thereof readily and rapidly manipulated.

The opposite ends of the pins 62, 62 which project beyond the cross holes 61, 61 in the threaded studs 60, 60 may be flattened as indicated by the dotted lines in FIG. 8, to increase the welding surface between the opposite ends of the pins 62, 62 and the underfaces of the flanges 23b, 23b.

If preferred, the studs 37, 37 may be welded to the end walls 36, 36 (FIG. 1) or 36a, 36a (FIGS. 4, 6, 8) of the inner pan 21 or 21a, respectively, in which event the studs 37, 37 may be formed without the shanks 50 and the stepped shoulders 49, 49 (FIG. 6) welded to the inner face of the end walls 36, 36 or 36a, 36a.

Handles are optional equipment and if used are preferably pivotally mounted to lie close to the end walls when not in use. The handles may be O-shaped loops of steel wire of a suitable gauge pivotally mounted in a convoluted strap or curled-over bead 71, 71 and spot welded at 72, 72 in the corner formed between the end walls 36 or 36a, and their respective lateral flanges 23 or 23a. While only one handle 70 is shown in FIG. 1, and in FIG. 4, it should be understood that when handles are used, one such handle 70 will be mounted at each end of the outer pan 22 or 22a. In the drawing each handle 70 (FIGS. 1 and 4) is shown moved to lifting position, but when not in use the handles drop to inoperative position beside their respective end walls 36 or 36a.

The pans may be made of aluminum, but for the higher priced field stainless steel pans are very attractive and will last indefinitely.

What is claimed is:

1. In a water jacketed roasting pan and in combination an outer pan, an inner pan of lesser depth nesting in said outer pan, the bottom, side and end walls of said pans when so nested being spaced apart to define a water receptacle therebetween, a plurality of studs secured to the end walls of said inner pan and projecting inwardly therefrom, said studs having enlarged heads, a spit on which an article to be roasted may be impaled, said spit being angle-shaped in cross section, both sides of said angle-shaped spit being bevelled at one end of said spit to define a point for facilitating the impaling of an article thereon, one side of the opposite end of said spit being notched, a rack for supporting said spit at different levels above said roasting pan, said rack including two vertical supports positioned in horizontally spaced relation when suitably supported, each of said supports being angle-shaped in cross section, a base plate attached to the bottom end of each of said supports and in continuation of said angle-shapes, each of said base plates being angularly offset at an obtuse angle relative to its said support, a plurality of slotted openings formed in said base plates, said slotted openings being sized to engage beneath the enlarged heads of said studs to maintain said supports in an erect and vertically aligned position at the opposite ends of said pan, each of said supports having a plurality of inwardly extending downwardly inclined notches formed in one side of its angle shape, each of said notches being sized to receive the notched side of said spit, and the notch in the notched side of said spit being sized to register in any notch in either of said supports to lock said spit to said supports, brace said base plates between said end walls and said studs and maintain said supports erect and in vertical alignment at the opposite ends of said pan.

2. The combination defined in claim 1 wherein the inner and the outer pans are each provided with a peripheral flange which projects laterally outwards from the upper edge of the walls of the pan of which it forms a part, and the flange around the periphery of the inner pan overlies and is bent around and beneath the peripheral flange of the outer pan to permanently lock said pans together as one jacketed unit roasting pan.

3. The combination defined in claim 1 wherein the inner and the outer pans are each provided with a peripheral flange which projects laterally outwards from the upper edge of the walls of the pan of which it forms a part, each of said flanges having a plurality of through openings formed therein, corresponding openings in each of said flanges being adapted to align with each other when said inner pan is correctly nested in said outer pan so that the flange of said inner pan overlies the flange of said outer pan, female threaded nuts secured beneath the flange of said outer pan in registry with the openings in said flange, and cap screws passing through the openings in the flange of said inner pan and screwing into said nuts to detachably lock said inner and outer pans in nested position to define a jacketed roasting pan unit.

4. The combination defined in claim 1 wherein the spit is notched adjacent both ends thereof, the said notches in said spit being spaced to register in a notch in each of said supports thereby locking said spit to both of said supports to interbrace said supports and said spit and to anchor said base plates between said end walls and said studs thereby maintaining said supports in vertical alignment at the opposite ends of said pan.

5. A rack and a spit, said rack being useful for supporting said spit above a roasting pan when an article to be roasted is impaled upon said spit, said rack consisting of a pair of twin supports, said suports and said spit each being angle-shaped in cross section, each of said supports having a plurality of inwardly extending and downwardly inclined notches formed in one side of its angle-shape and in spaced relation to each other, both sides of said spit at one end thereof being bevelled to a point for penetrating an article to be impaled upon said spit, said spit having a notch formed in one side of its angle-shape adjacent the opposite ends thereof, and the notches in said spit being sized to register with the notches in said supports to interlock said spit and said supports.

References Cited in the file of this patent

UNITED STATES PATENTS

| | | |
|---|---|---|
| 1,888,616 | Bocchino | Nov. 22, 1932 |
| 2,951,435 | Fry | Sept. 6, 1960 |